United States Patent

Humes et al.

[11] Patent Number: 5,897,162
[45] Date of Patent: Apr. 27, 1999

[54] HEATED CHILD SAFETY SEAT

[76] Inventors: Linda A. Humes; William J. Humes, both of 277 Barnert Ave., Totowa, N.J. 07512

[21] Appl. No.: 08/978,086

[22] Filed: Nov. 25, 1997

[51] Int. Cl.⁶ ........................................... A47C 7/72
[52] U.S. Cl. ................................. 297/180.12; 297/250.1
[58] Field of Search ........................... 297/250.1, 219.1, 297/180.12, 180.11, 180.1, 217.3, 256.15, 452.48, 452.58

[56] References Cited

U.S. PATENT DOCUMENTS

| | | |
|---|---|---|
| 4,695,092 | 9/1987 | Hittie . |
| 5,002,335 | 3/1991 | Bengtsson . |
| 5,067,771 | 11/1991 | Ellis . |

FOREIGN PATENT DOCUMENTS

| | | |
|---|---|---|
| 3513909 | 10/1986 | Germany . |
| 3818406 | 12/1989 | Germany . |
| 4034929 | 5/1992 | Germany . |
| 94/009684 | 5/1994 | WIPO . |

*Primary Examiner*—Milton Nelson, Jr.
*Attorney, Agent, or Firm*—Lawrence G. Fridman

[57] ABSTRACT

A child safety seat for a motor vehicle having an independent heating arrangement includes a seat body with a seat portion, a backrest portion and two side portions transverse to said seat and backrest portions. A child receiving recessed area is formed by the seat, backrest and side portions with an insulating padding disposed therein.

An electrical heating element is substantially disposed between the insulating padding and a protective cover substantially extending about at least the seat and backrest portions, so that in operation a substantial portion of the child receiving recessed area is heated by the electrical heating element.

19 Claims, 3 Drawing Sheets

HEATED CHILD SAFETY SEAT

FIELD OF THE INVENTION

The present invention relates to child safety seats for vehicle use, and more particularly to heated child safety seats.

BACKGROUND OF THE INVENTION

In motor vehicles, safety seats have been used to maintain the seated posture of small children during travel and protect them from injuries at times of collision and from shocks at times of acceleration and deceleration. Current safety regulations make it mandatory that infants and small children are restrained while in an operating motor vehicle. In many states, such regulations mandate the use of child safety seats for children up to the age of four years. Modern child safety seats are typically removable structures which are positioned on permanent automotive seats during operation of a vehicle.

There have been known various seats forming a permanent part of a vehicle having a built-in heating device adapted to warm bodies of occupants. Such heated seats are known to be particularly common in European-built cars in which both the driver and passenger seats are provided with electrical heating elements. Several different types of heating elements and methods of attachment thereof to stationary car seats are known in the automobile industry.

Known heated seats are substantially stationary with respect to a body of automobile and form its inseparable part. However, there is a known need for removable heated child safety seats capable of providing rapid heating of seating area and having heating arrangements independent from that of the stationary car seats. The demand for such heated child safety seats is quite acute especially during cold seasons and/or in geographical locations having severe climate conditions. There is a specific need for autonomous heated child safety seats having heating elements distributed along its entire seating area, so that a child placed in such seat can be expeditiously heated. It is not uncommon for a child to be restrained within the child safety seat inside the car when engine and automobile heating systems are not operational. Furthermore, a child can be carried outside of the vehicle within such safety seat. All these make it important to provide child safety seats with a heating system independent from that of an automobile, so as to expeditiously warm a child's body.

SUMMARY OF THE INVENTION

One aspect of the present invention provides a heated child safety seat for a motor vehicle independent from a stationary seat thereof having a seat body which includes a seat portion, a backrest portion and two side portions transverse to the seat and back portions. A child receiving recessed area is formed by the seat, backrest and side portions with insulating padding disposed within the receiving recessed area. A protective cover is provided outside the insulating padding with an electrical heating element disposed between the insulating padding and the protective cover. The electrical heating element substantially extends about the seat, backrest and side portions, so that in operation the entire area of the child receiving recessed area is heated by an electrical heating element.

According to another aspect of the invention, the insulating padding is fixedly attached to an interior of the child receiving recessed area and a peripheral portion of the electrical heating element is affixed to the insulating padding in such a manner that the electrical heating element can be entirely bonded to the padding. The protective or insulating cover is a cushion member having an air permeable property so that a heat generated by the electrical heating element is transmitted to a child sitting in the safety seat.

According to a further aspect of the invention, the electrical heating element is a single electrical heating wire arranged in a serpentine manner and a connection cable electrically connects electrical heating element to deliver electric current from the power source.

Still another aspect of the invention provides the heated child safety seat with a power arrangement for directing of current to and energizing the electrical heating element. The power arrangement includes a battery pack and a recharging arrangement for recharging the battery pack. The recharging circuit is adapted for connection to the battery pack and includes an arrangement for connecting to an AC voltage source and directing the resulting AC voltage to the recharging arrangement. A thermal switch connects the power arrangement for effectively switching a power source off in response to the temperature within the child receiving recessed area setting a pre-determined temperature and switching the power source on in response to the temperature within the child receiving area falling below the pre-determined temperature. The seat body is formed with an internal cavity positioned remotely from the child receiving recessed area and adapted for receiving a battery pack therein. The body further includes a charge socket electrically connected to the power source to be recharged from an outside source of electrical energy.

A still further aspect of the invention provides a child safety seat for use in a motor vehicle having stationary seats provided therein. The child safety seat includes a base for placement on the stationary seat of the motor vehicle, and a restraining arrangement for securely connecting the child to the safety seat. The child safety seat further comprises a seat body including a seat portion, a backrest portion and two side portions transverse to the seat and the backrest portions. A child receiving recessed area is formed by the seat, backrest and side portions. A heating arrangement is provided including an insulating padding made from soft and flexible material. The insulating padding is provided having exterior and interior regions. An electrical heating element is associated with a part of the interior area of the insulating padding extending over at least the seat and backrest portion. A protective insulating cover engages the exterior area of the insulating padding and being enveloped by a material having substantial waterproofing characteristics. The heating arrangement is situated within the seat body, so that the exterior area of the insulating padding is fixedly attached to an interior of the child receiving recessed area. An interior cavity is provided within the seat body remotely from the child receiving recessed area and adapted to receive a battery pack therein. The electrical heating element is operably connected to the battery pack.

BRIEF DESCRIPTION OF THE DRAWINGS

Other advantages and features of the invention are described with reference to exemplary embodiments, which are intended to explain and not to limit the invention, and are illustrated in the drawings in which.

DETAILED DESCRIPTION OF THE PREFERRED EMBODIMENT

Figure 1:
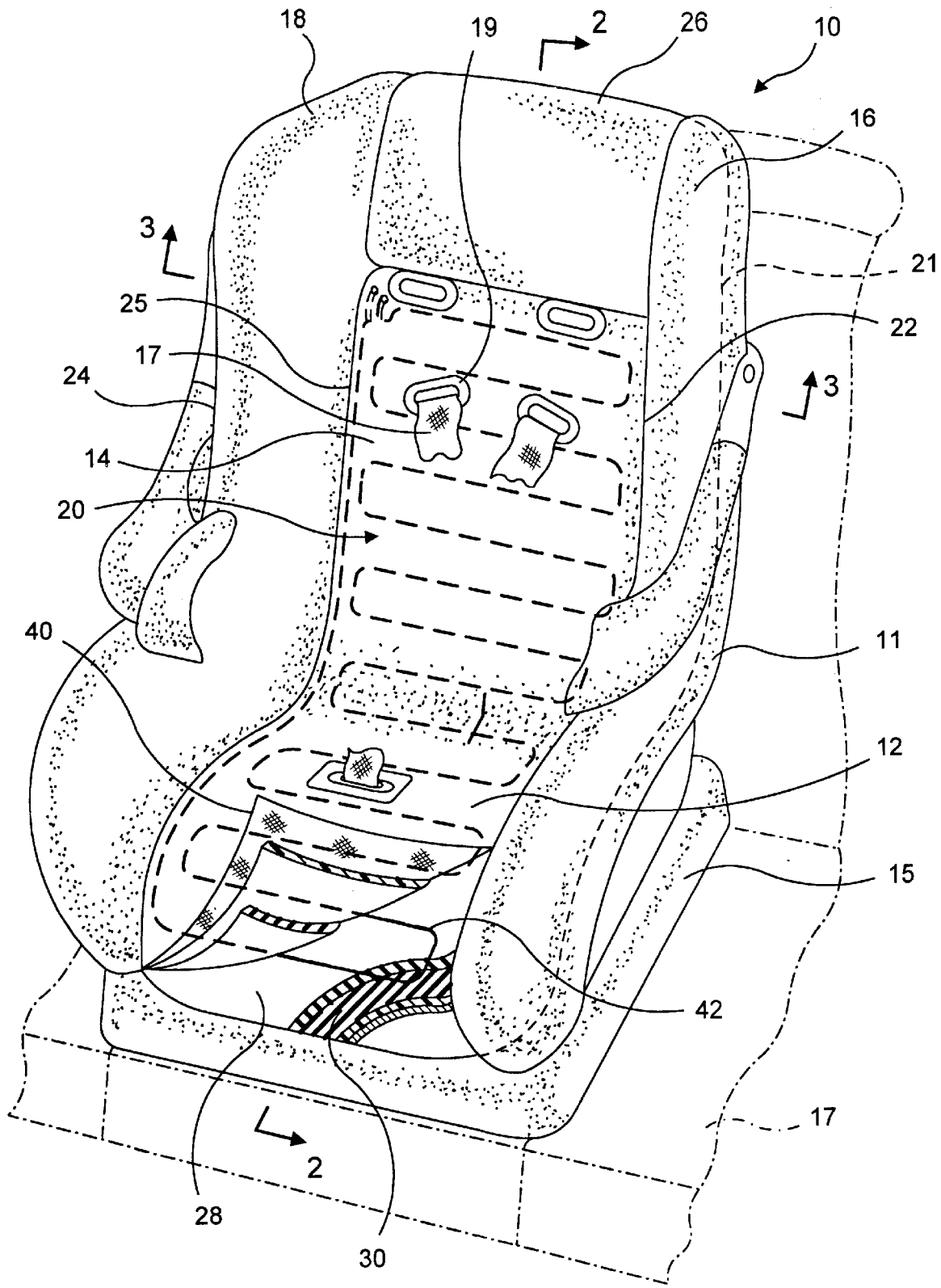
FIG. 1 is a perspective view showing a heated child safety seat of the invention.

Referring now to the drawings and particularly to FIG. 1, a heated child safety seat according to the invention is generally denoted by number 10. The seat consists of a body 11 which includes a base 15, a seat portion 12 for seating a child, a backrest 14 attached to the seat portion for supporting the back of the child and first and second spaced apart side portions 16 and 18 transverse to the seat and backrest portions.

As shown in FIG. 1, the first side portion 16 extends between a first outer edge 22 and corresponding first inner edge 21. In a similar manner, the second side portion 18 extends between the second outer edge 24 and the second inner edge 25. The outer boundary of the seat portion 12 and the backrest 14 are delimited by the lower outer edge 28 and the upper outer edge 26. The interior of the seat, backrest and two side portions form a child receiving recessed area 20 adapted to receive a child during operation of the safety seat of the present invention. The child safety seat of the invention can be formed as a unitary body or an assembly containing the above-described elements.

A child seatbelt arrangement 17 is usually provided for restraining a child seated in the receiving recessed area 20. A plurality of slots 19 adapted for passage of the child seatbelts is formed within the body 11. In use, the child safety seat is attached to a stationary seat 17 of a motor vehicle (shown in FIG. 1 in phantom lines) by a conventional anchor arrangement.

As best illustrated in FIGS. 1–4, an insulating padding 30 having exterior 32 and interior 34 regions is associated with the child receiving recessed area 20. The padding 30 can include layers of foam rubber, foam plastic or other resilient material having suitable elasticity which provides good seating comfort and required electrical insulating properties. An insulating cover 40 is situated outside of the insulating padding.

Figure 2:
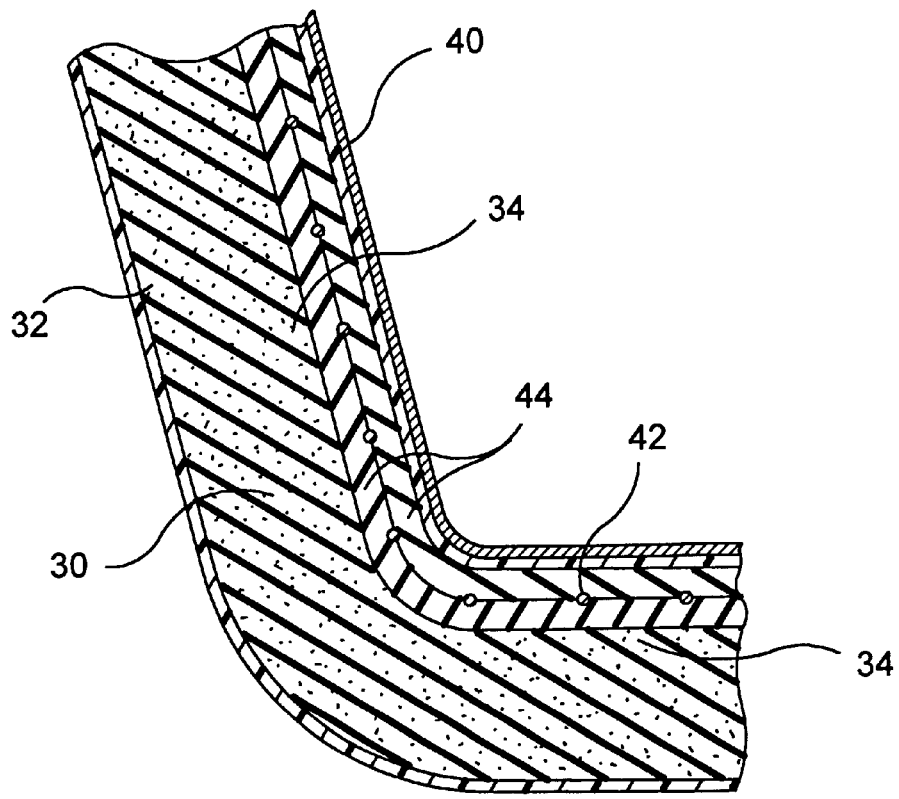
FIG. 2 is a partial cross-sectional view according to section line 2—2 of FIG. 1.
Figure 3:
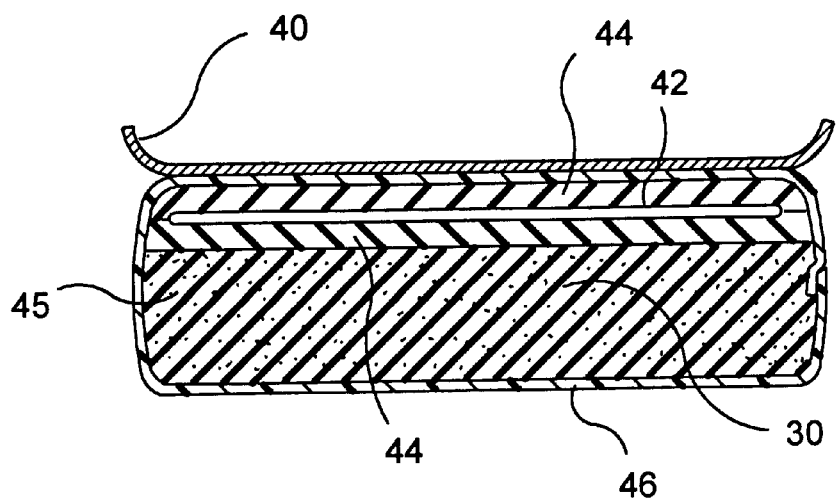
FIG. 3 is a partial cross-sectional view according to section line 3—3 of FIG. 1.
Figure 4:
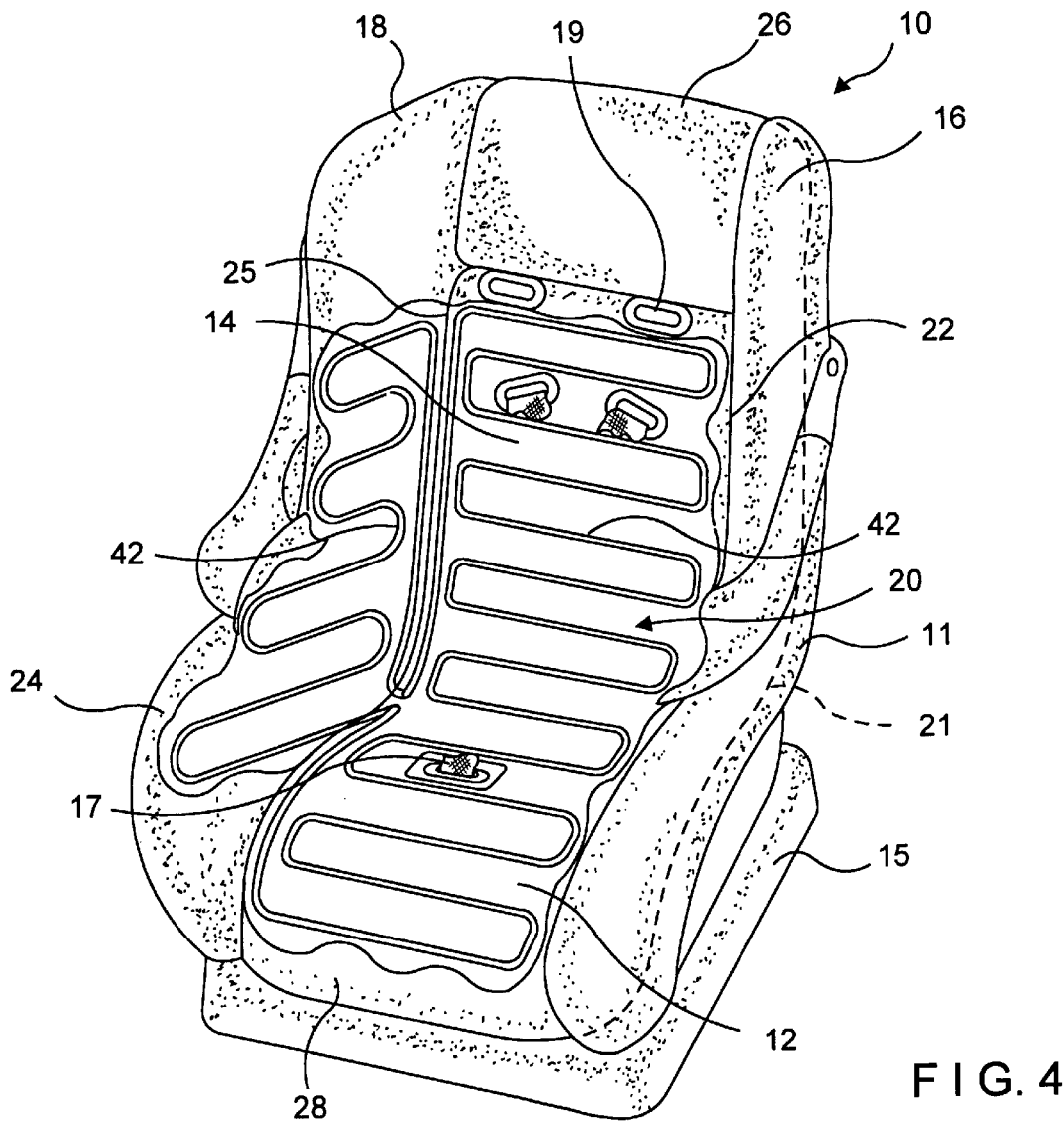
FIG. 4 is a perspective view of another embodiment of the heated child safety seat of the invention with partially removed insulating cover.

An electrical heating element 42 provided for electrically heating the child safety seat is situated between the padding 30 and the cover 40. As best illustrated in FIGS. 1–3, electrical insulating layer 44 surrounds the electrical heating element 42. The heating element 42 is typically an elongated flexible resistance element which is made of a suitable metal alloy. Conventionally, the heating element is formed with a terminal end portion extending to a special junction block where it is connected to a battery pack 52. As shown in FIGS. 1 and 4, the electrical heating element 42 can be manufactured having either a single or multiple electrical heating wires. In the embodiment of the invention shown in FIG. 1, the electrical heating element 42 extends only at the seat 12 and backrest 14 portions.

However, the embodiment of the invention in which the electrical heating element 42 is provided to cover the entire child receiving recessed area 20 including the seat 12, backrest 14 and two side portions 16 and 18 (see FIG. 4), is also contemplated.

To enhance stability of the heating arrangement within the child safety seat, a heating block 45 (see FIG. 3 for example) is formed in the present invention. The block 45 encompasses the padding 30 and the insulating layer 44 with the heating element 42 enveloped by a sheath 46. When the insulating padding 30 is formed from soft and flexible material having good electrical insulating and other capabilities, the electrical heating element 42 through the insulated layer 44 can be embedded into the padding 30 in such a manner that the heating element is integrally bonded to the padding.

In the assembled condition of the heated child safety seat of the invention, the heating block 45 including the insulating padding 30 is positioned within the child receiving recessed area 20. Thus, as to the first side portion 16 (see FIG. 4), the padding and the electrical heating element 42 extend from the first outer edge 22 to the first inner edge 21. Similarly, in the second side element 18, the padding and the corresponding portion of the electrical heating element extend from the second outer edge 24 toward the second inner edge 25. As to the seat portion 12 and backrest 14, the padding and the heating element extend from the lower outer edge 28 in the direction of the upper outer edge 26. In this condition, as illustrated in FIG. 4, the entire child receiving recessed area 20 is substantially covered by the electrical heating element.

The insulating cover 40 can be in the form of a cushion made of flexible elastic material, so that a mass of that material is sufficient to prevent contacts between the heating element and the exterior of the infant clothes. On the other hand, the mass of such material should be sufficiently small, so that it requires little energy to be quickly heated to a desired temperature. Since the heat storing capacity of the cover cushion is small, it typically cools rapidly. The insulating cover 40 is sufficiently thin and flexible, so that it does not impart excessive stiffness and/or bulk to the heater's structure which might prevent the structure from being easily and quickly and conveniently engaged and formed about an infant body. An air permeable property of the insulating cover is such that a heat generated by the electrical heating element is easily transmitted to a child sitting within the child receiving recessed area. Examples of such air permeable materials are woven or knitted fabrics. To enhance electrical insulating qualities, the insulating cover can be enveloped by a thin plastic sheath also providing waterproofing of the heating arrangement.

The heated child seat of the invention is designed to be primarily powered by the independent power source such as a battery pack indicated generally by numeral 52.

Figure 5:
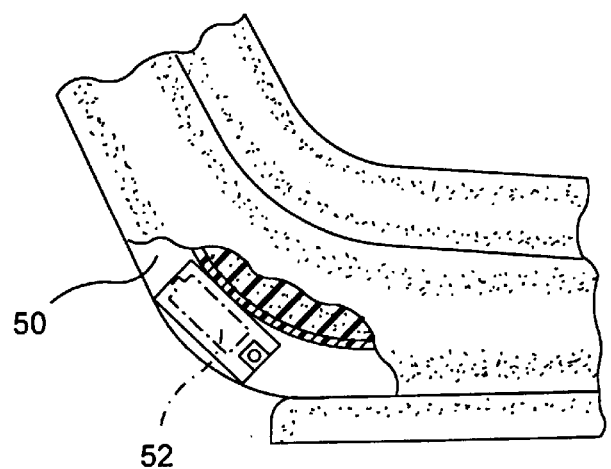
FIG. 5 is a partial breakaway view showing positioning of a battery pack.

The seat body is formed having at least one internal cavity 50 situated remotely from the child receiving recessed area and adapted for receiving an independent power source such as the battery pack 52. For example, as it is shown in the embodiment of FIG. 5, the internal cavity can be situated at the rear of the safety seat. An outside wall of the seat adjacent to the internal cavity can be formed with oblong aperture having a cover. It is contemplated that any suitable type of batteries can be used to operate the present invention. Depending on the voltage desired and size/weight restrictions, any number of batteries can be selected providing required electrical supply. In one of the embodiments of the invention, for example, the battery pack 52 can contain four batteries. The charge socket can be electrically associated with the power source enabling the power source to be recharged from an outside electric source. A conventional 110 V charger can amply charge the battery pack 52 either in place inside the seat or upon its removal therefrom.

With this structure, and the heating device switched on, heat generated by the electrical heating element extending substantially through the child receiving recessed area is transmitted through the insulating cover 40 to a body of a child to be heated. It has been found that such arrangement can improve condition of a child considerably, so as to enable a child to be more comfortable within the car, especially in winter weather when either a car engine or a car heater is not functioning. Furthermore, the invention also substantially enhances the condition of a child who is carried out of the vehicle within the safety seat.

The present invention entails a battery-powered child safety seat which can be manufactured with a recharging arrangement that is designed to quickly and efficiently recharge the battery pack. To protect battery pack from excessive temperature during the charging process and operation, there can be provided a thermal switch that is operative to sense the temperature within the battery pack. In the event that the temperature of the pack exceeds a predetermined level, the thermal switch is operative to open and, consequently, to terminate flow of charging current to the battery pack. In addition, the recharging arrangement of the invention has the advantage of having the capability for directly powering the child safety seat independently of the battery pack.

As a safety feature to prevent hyperthermia of a child, there can be provided a thermal switch or a circuit that is operatably associated with the child receiving recessed area for sensing the temperature therein. This thermal switch/circuit is designed such that in the event the temperature of the seat exceeds a certain level, the heating arrangement is operative to terminate the delivery of power thereto. Conversely, when the temperature in the child receiving recessed area 20 falls below the predetermined temperature (for example, when the child is carried out of the vehicle within the safety seat) the heating arrangement is operative to initiate delivery of the power to the electrical heating element. In practice, the heating arrangement can include suitable temperature responsive control means, for example, a normally closed temperature responsive switch device such as a thermostat switch. It should be obvious to a person skilled in the present art that the shape or form and location of the battery pack, as well as the arrangement or pattern of the heating element, can vary without adversely affecting or departing from the spirit of the invention.

Although the above-discussed embodiments of the invention relate to a child safety seat adapted for use in a motor vehicle having stationary seats provided therein, similar design child seats having autonomous heating systems and capable of providing rapid heating of a child can be used in different applications. For example, similarly designed heated seats can be utilized with strollers, outdoor children's furniture and other similar circumstances requiring seating or transportation of children in cold climate conditions.

Consequently, it is obvious to a person of ordinary skill in the present art that the heated child safety seat of the invention presents a very practical and useful arrangement. This is specifically true inasmuch as the entire system is relatively simple and inexpensive and easy to maintain in use.

With respect to the above description, it is to be realized that the optimum dimensional relationship for the parts of the invention, to include variations in size, materials, shape, form, function and the manner of operation, assembly and use, are deemed readily apparent and obvious to one skilled in the art, and all equivalent relationship to those illustrated in the drawings and described in the specification are intended to be encompassed by the present invention.

Therefore, the foregoing is considered as illustrative only of the principles of the invention, further, since numerous modifications and changes are obvious to those skilled in the art, it is not desired to limit the invention to exact construction and operation shown and described, and accordingly, all suitable modifications and equivalents may be resorted to, falling within the scope of the invention.

What is claimed is:

1. A child safety seat for a motor vehicle having an independent heating arrangement comprising:
    a child safety seat having a seat body, said seat body including a seat portion, a backrest portion and two side portions transverse to said seat and backrest portions, a child receiving recessed area formed by said seat, backrest and side portions; an insulating padding disposed within said child receiving recessed area;
    a protective cover;
    an electrical heating element substantially disposed between said insulating padding and said protective cover and substantially extending about said seat and backrest portions, said electrical heating element is surrounded by an insulating layer and a heating block is formed in such a manner that said padding and said insulating layer with the heating element are enveloped by a sheath, so that in operation a substantial portion of said child receiving recessed area being heated by said electrical heating element.

2. The heated child safety seat of claim 1, further comprising a power arrangement for directing current to and energizing said electrical heating element, said power arrangement including a battery pack.

3. The heated child safety seat of claim 2, wherein said power arrangement further comprising a recharging circuit for recharging said battery pack, said recharging circuit being adapted for connection to said battery pack for recharging the same.

4. The heated child safety seat of claim 2, wherein said electrical heating element is a single electrical heating wire arranged in a serpentine manner.

5. The heated child safety seat of claim 2, wherein said electrical heating element comprises a plurality of electrical heating wires arranged in a serpentine manner.

6. A heated child safety seat of claim 2, further comprising a connection cable electrically connected to said electrical heating element for delivering electric current from said power arrangement to said electrical heating element.

7. The heated child safety seat of claim 2, further including a thermal switch operatably connected to said power arrangement for effectively switching a power source off in response to the temperature within said child receiving recessed area reaching a predetermined level and switching said power source on in response to the temperature within said child receiving recessed area falling below a predetermined level.

8. The heated child safety seat of claim 7, wherein said electrical heating element extends about said side portions, so that the entire child receiving recessed area is covered by said electrical heating element and said padding is fixedly attached to an interior of said child receiving recessed area and a peripheral portion of said electrical heating element is affixed to said insulating padding in such a manner that said electrical heating element is integrally bonded to said padding.

9. The heated child safety seat of claim 8, wherein said protective cover is a cushion member having an air permeable property so that a heat generated by said electrical heating element is transmitted to a child sitting in said safety seat.

10. The heated child safety seat of claim 9, wherein said seat body is formed with an oblong aperture positioned remotely from said child receiving recessed area and adapted for receiving a battery pack therein, said body further including a charge socket electrically connected to the power source to be recharged from an outside source of electrical energy.

11. A child safety seat for use in a motor vehicle having stationary seats provided therein, said child safety seat including a base for placement on the stationary seat of a motor vehicle, a restraining arrangement for securely connecting a child to the safety seat, and an anchor arrangement for connecting the base to the stationary seat of the motor vehicle, said child safety seat comprising:

a seat body, said seat body including a seat portion, a backrest portion and two side portions transverse to said seat and backrest portions, a child receiving recessed area formed by said seat, backrest and side portions, said child receiving recessed area having at least an interior part; and a heating arrangement including an insulating padding made from a soft and flexible material, said insulating padding extending over said seat, side and backrest portions and formed having exterior and interior regions; and an electrical heating element directed through said interior region of said insulating padding; said heating arrangement being situated within said seat body;

whereby the child receiving recessed area is covered by said electrical heating element and said insulating padding is fixedly attached to said interior part of said child receiving recessed area, said electrical heating element is surrounded by an insulating layer and a heating block is formed in such a manner that said padding and said insulating layer with the heating element are enveloped by a sheath.

12. The heated child safety seat of claim 11, wherein said electrical heating element further extends about said side portions.

13. The heated child safety seat of claim 11 wherein a peripheral portion of said electrical heating element is imbedded into said insulating layer in such a manner that at least a portion of said electrical heating element and said insulating layer are integrally bonded to said insulating padding, and a protective cover in form of a cushion member having substantial air permeable property is provided to facilitate transmission of heat generated by said electrical heating element to a child sitting in said safety seat.

14. The heated child safety seat of claim 11, wherein said electrical heating element is a single electrical heating wire arranged in a serpentine manner.

15. The heated child safety seat of claim 11, wherein said electrical heating element comprises a plurality of electrical heating wires arranged in a serpentine manner.

16. The heated child safety seat of claim 11, wherein said seat body is formed with an interior cavity positioned remotely from said child receiving recessed area and receiving a battery pack therein, said battery pack forming a part of a power arrangement for directing current to and energizing said electrical heating element, said body further including a charge socket electrically connected to the power arrangement to be recharged from an outside source of electrical energy.

17. The heated child safety seat of claim 11, further comprising a power arrangement for directing current to and energizing said electrical heating element, said power arrangement including a battery pack and an arrangement for recharging said battery pack, at least a portion of said power arrangement being situated within an interior cavity provided within said seat body remotely from said child receiving recessed area.

18. The heated child safety seat of claim 17, further including a thermal switch operatably connected to said power arrangement for effectively switching a power source off in response to the temperature within said child receiving recessed area setting a predetermined temperature and switching said power source on in response to the temperature within said child receiving recessed area falling below the predetermined temperature.

19. A child safety seat for use in a motor vehicle having stationary seats provided therein, said child safety seat including a base for placement on the stationary seat of a motor vehicle, a restraining arrangement for securely connecting the child to the safety seat, and an anchor arrangement for connecting the base to the stationary seat of the motor vehicle, said child safety seat comprising;

a seat body, said seat body including a seat portion, a backrest portion and two side portions transverse to said seat and backrest portions, a child receiving recessed area formed by said seat, backrest and side portions;

a heating arrangement including an insulating padding made from a soft and flexible material, said insulating padding formed having exterior and interior regions; and electrical heating element directed through said interior region of said insulating padding extending over at least said seat and backrest portions; said heating arrangement being situated within said seat body; and an interior cavity provided within said seat body remotely from said child receiving recessed area and receiving a battery pack therein, said electrical heating element being operably connected to said battery pack.

* * * * *